(12) United States Patent
Asai et al.

(10) Patent No.: US 10,469,889 B2
(45) Date of Patent: Nov. 5, 2019

(54) INFORMATION DISTRIBUTION DEVICE, INFORMATION RECEPTION DEVICE, SYSTEM, PROGRAM, AND METHOD

(71) Applicant: NEC Corporation, Tokyo (JP)

(72) Inventors: Toshio Asai, Tokyo (JP); Akira Inoue, Tokyo (JP); Susumu Okuyama, Tokyo (JP); Takeshi Kondo, Tokyo (JP); Soichi Tsumura, Kawasaki (JP); Takayuki Nagai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/407,564

(22) Filed: Jan. 17, 2017

(65) Prior Publication Data

US 2017/0127109 A1     May 4, 2017

Related U.S. Application Data

(62) Division of application No. 14/110,732, filed as application No. PCT/JP2012/058030 on Mar. 21, 2012, now abandoned.

(30) Foreign Application Priority Data

Apr. 11, 2011  (JP) .................................. 2011-087492

(51) Int. Cl.
*H04N 21/233* (2011.01)
*H04N 21/234* (2011.01)
(Continued)

(52) U.S. Cl.
CPC ..... *H04N 21/2668* (2013.01); *G06Q 30/0251* (2013.01); *G06Q 30/0255* (2013.01);
(Continued)

(58) Field of Classification Search
None
See application file for complete search history.

(56) References Cited

U.S. PATENT DOCUMENTS 8,957,847 B1 * 2/2015 Karakotsios ............ G06F 3/013
345/156
2001/0042019 A1  11/2001 Omachi
(Continued)

FOREIGN PATENT DOCUMENTS

CN          1388930 A      1/2003
CN        101470883 A      7/2009
(Continued)

OTHER PUBLICATIONS

Second Office Action issued by the Chinese Patent Office in counterpart Chinese Patent Application No. 2012800250152, dated Jan. 5, 2016.
(Continued)

*Primary Examiner* — Brian T Pendleton
*Assistant Examiner* — Jean D Saint Cyr
(74) *Attorney, Agent, or Firm* — Finnegan, Henderson, Farabow, Garrett & Dunner, L.L.P.

(57) ABSTRACT

Provided are an information distribution device, system, program, and method that can increase the effectiveness of advertisements. The information distribution device selects advertisements to distribute based on viewer attributes collected while distributing content to a display unit.

21 Claims, 12 Drawing Sheets

Figure 9:
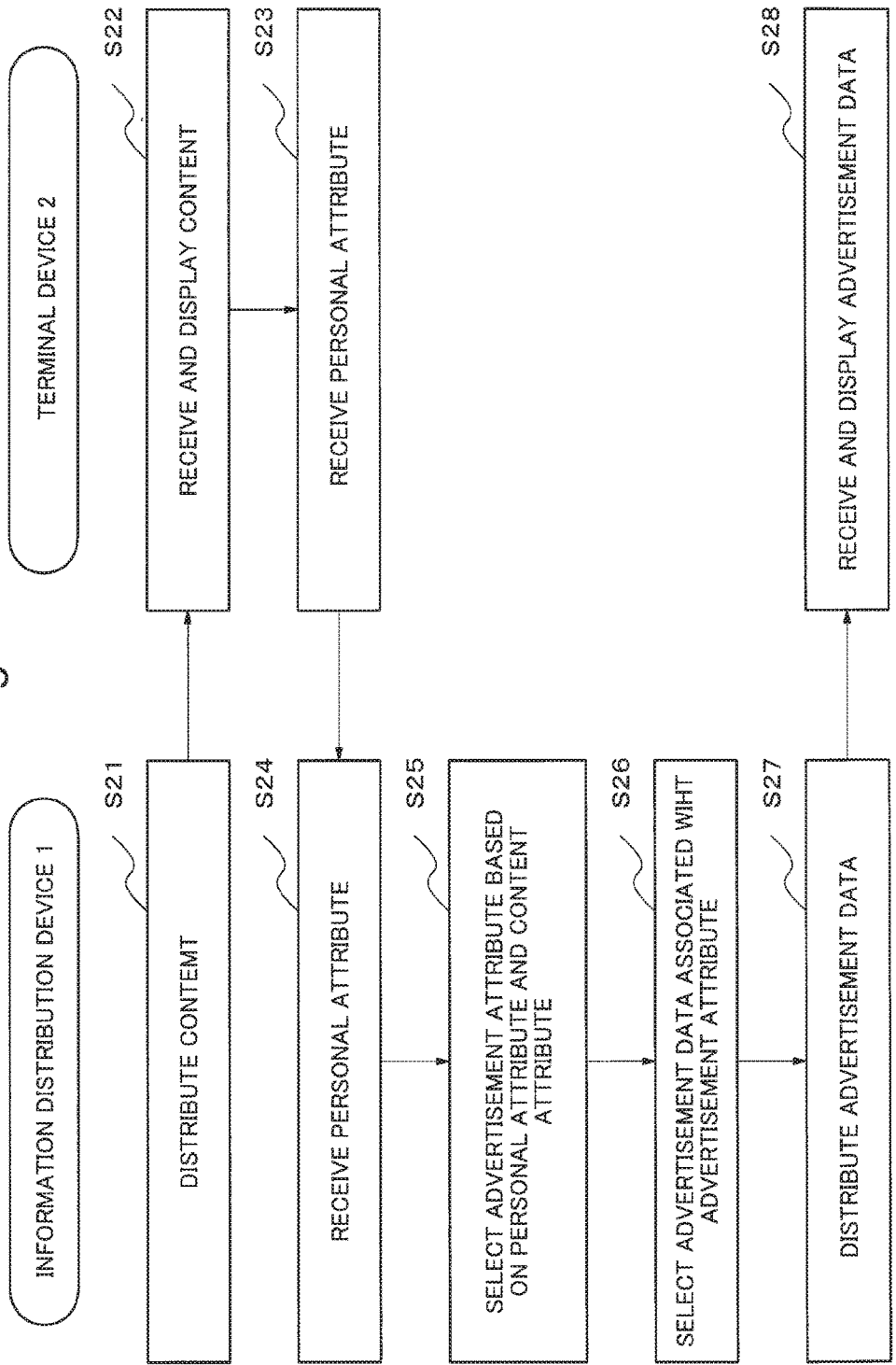

(51) Int. Cl.
*H04N 21/2343* (2011.01)
*H04N 21/25* (2011.01)
*H04N 21/258* (2011.01)
*H04N 21/45* (2011.01)
*H04N 21/2668* (2011.01)
*G06Q 30/02* (2012.01)
*H04N 21/81* (2011.01)
*H04L 29/08* (2006.01)
*H04N 21/431* (2011.01)
*H04N 21/466* (2011.01)

(52) U.S. Cl.
CPC ....... H04L 67/306 (2013.01); H04N 21/4316 (2013.01); H04N 21/4532 (2013.01); H04N 21/4667 (2013.01); H04N 21/812 (2013.01)

(56) References Cited

U.S. PATENT DOCUMENTS

| | | | |
|---|---|---|---|
| 2002/0046009 A1 | 4/2002 | Frengut et al. | |
| 2002/0046099 A1* | 4/2002 | Frengut ................. | G06Q 30/02 705/14.52 |
| 2002/0152122 A1 | 10/2002 | Chino et al. | |
| 2003/0163311 A1 | 8/2003 | Gong | |
| 2004/0205627 A1* | 10/2004 | Rosenholtz ......... | G06F 16/9577 715/273 |
| 2005/0289582 A1 | 12/2005 | Tavares et al. | |
| 2009/0113297 A1 | 4/2009 | Jung et al. | |
| 2009/0285582 A1 | 11/2009 | Miao et al. | |
| 2010/0017261 A1* | 1/2010 | Evans ................... | G06Q 30/02 705/7.34 |
| 2011/0218859 A1* | 9/2011 | Wang ................... | G06Q 30/02 705/14.53 |
| 2013/0227608 A1* | 8/2013 | Evans ............. | H04N 21/23424 725/35 |

FOREIGN PATENT DOCUMENTS

| | | |
|---|---|---|
| CN | 201383313 Y | 1/2010 |
| EP | 0 743 041 A1 | 11/1996 |
| EP | 1 093 633 B1 | 9/2007 |
| EP | 1 962 497 A1 | 8/2008 |
| JP | 2002-024674 | 1/2002 |
| JP | 2002-146412 | 5/2002 |
| JP | 2003-209822 | 7/2003 |
| JP | 2004-157498 | 6/2004 |
| JP | 2005-522718 | 7/2005 |
| JP | 2010-102235 | 5/2010 |
| JP | 2010-146412 | 7/2010 |
| JP | 2011-53767 | 3/2011 |
| WO | WO 00/62239 | 10/2000 |

OTHER PUBLICATIONS

Office Action issued by the Chinese Patent Office in counterpart Chinese Patent Application No. 2012800250152, dated May 13, 2015.
Office Action issued by the Japanese Patent Office in counterpart Japanese Patent Application No. 2013-509843, dated May 19, 2015.
International Search Report of the Japanese Patent Office and Written Opinion of ISA (translation), dated Apr. 24, 2012.
Office Action (Extended European Search Report) dated Jul. 31, 2014, issued by the European Patent Office in counterpart European Patent Application No. 12771517.5.

* cited by examiner

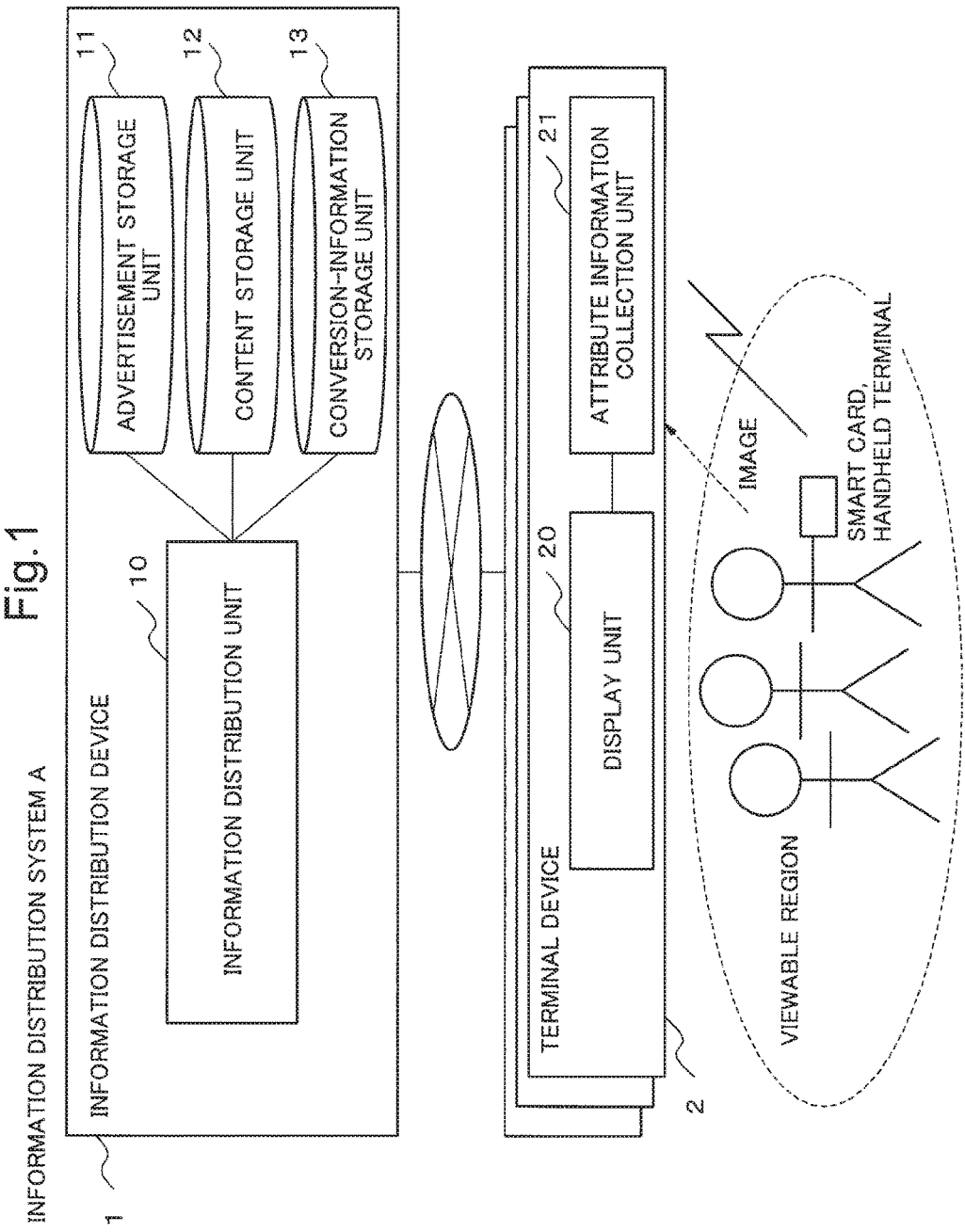

Fig.2

| ADVERTISEMENT ATTRIBUTE | ADVERTISEMENT DATA |
|---|---|
| GOLF CLUB | "ADVERTISEMENT DATA 1" |
| FASTFOODS 1 | "ADVERTISEMENT DATA 2" |
| TOY | "ADVERTISEMENT DATA 3" |
| CLOCK | "ADVERTISEMENT DATA 4" |
| CLOTHING | "ADVERTISEMENT DATA 5" |
| ANTIQUE | "ADVERTISEMENT DATA 6" |
| GOLF TOY | "ADVERTISEMENT DATA 7" |
| FASTFOODS 2 | "ADVERTISEMENT DATA 8" |
| ... | ... |

Fig.3

| CONTENT ATTRIBUTE | CONTENT DATA |
|---|---|
| GOLF PROGRAM | "CONTENT DATA 1" |
| TRAVEL PROGRAM | "CONTENT DATA 2" |
| DRAMA | "CONTENT DATA 3" |
| HISTRICAL PLAY | "CONTENT DATA 4" |
| ... | ... |

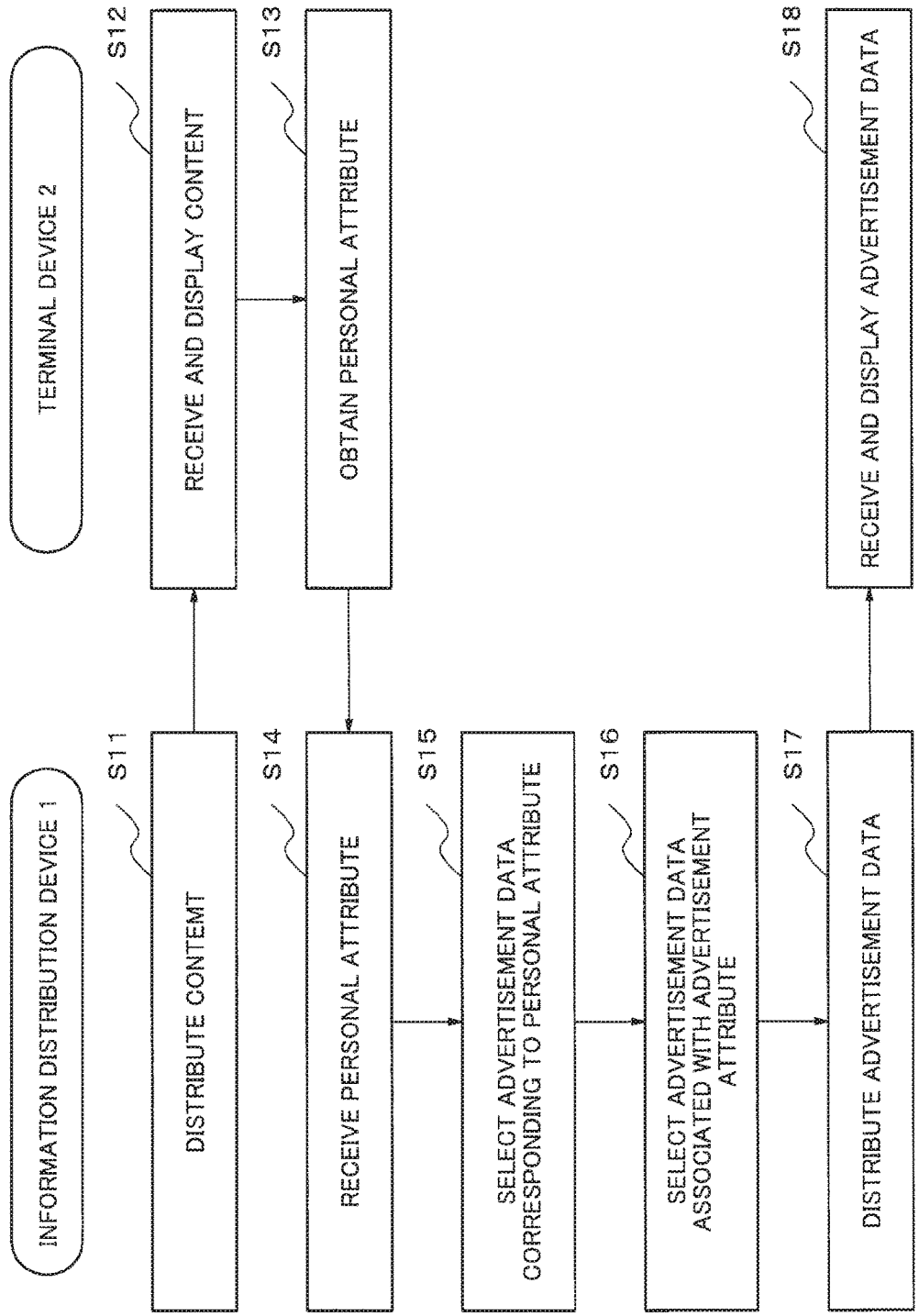

Fig.5

CHANNEL: CHANNEL 2

CHANNEL: CHANNEL 1

| TIME | PERSONAL ATTRIBUTE | | | ADVERTISEMENT ATTRIBUTE |
|---|---|---|---|---|
| | SEX | AGE | | |
| 2010.1210, 12:00:00 – 12:15:30 | MALE | 12 OR LESS | | TOY |
| | | OTHERS | | CLOCK |
| | FEMALE | – | | CLOTHING |
| 2010.1210, 12:16:00 – 12:30:30 | MALE | 10'S OR LESS | | FASTFOODS |
| | | OTHERS | | FASTFOODS |
| | FEMALE | 10'S OR LESS | | TOY |
| | | 20'S TO 30'S | | CLOTHING |
| | | 40'S OR MORE | | CLOCK |
| ... | ... | ... | | ... |

Fig.6

| CLOCK | CHANNEL 1 | CHANNEL 2 | ... |
|---|---|---|---|
| ... | ... | | |
| 2010.1210, 12:00:00 – 12:15:30 | GOLF PROGRAM: CONTENT DATA 1 | | |
| 2010.1210, 12:15:30 – 12:16:00 | <ADVERTISEMENT SLOT> | | |
| 2010.1210, 12:16:00 – 12:30:30 | GOLF PROGRAM: CONTENT DATA 1 | | |
| 2010.1210, 12:30:30 – 12:31:30 | <ADVERTISEMENT SLOT> | | |
| 2010.1210, 12:31:30 – 12:40:30 | TRAVEL PROGRAM: CONTENT DATA 2 | | |
| ... | ... | | |

Fig.7

| DIRECTION OF FACE | COEFFICIENT 1 |
|---|---|
| FRONT SIDE | 1 |
| RIGHT SIDE AND LEFT SIDE | 0.5 |
| UPSIDE AND DOWNSIDE | 0.5 |
| BACK SIDE | 0 |

| SIZE OF PUPIL | COEFFICIENT 2 |
|---|---|
| LARGE | 1 |
| MEDIUM | 0.5 |
| SMALL | 0 |

Fig.8

CHANNEL: CHANNEL 2

CHANNEL: CHANNEL 1

| CONTENT ATTRIBUTE | PERSONAL ATTRIBUTE | | ADVERTISEMENT ATTRIBUTE |
|---|---|---|---|
| | SEX | AGE | |
| GOLF PROGRAM | MALE | 12 OR LESS | GOLF TOY |
| | | OTHERS | GOLF CLUB |
| | FEMALE | — | GOLF CLOTHING |
| TRAVEL PROGRAM | MALE | UNDER 40'S | HOTEL |
| | | 40'S OR MORE | JAPANESE INN |
| | FEMALE | 10'S OR LESS | PENSION |
| | | 20'S TO 30'S | HOTEL |
| | | 40'S OR MORE | JAPANESE INN |
| ... | | ... | ... |

Fig. 10

| CONTENT ATTRIBUTE | CONTENT DATA | COLLECTION TIME |
|---|---|---|
| GOLF PROGRAM | "CONTENT DATA 1" | 12:10:14 |
| TRAVEL PROGRAM | "CONTENT DATA 2" | 12:33:22 – 12:34:50 |
| DRAMA | "CONTENT DATA 3" | 13:30:12<br>13:35:11 |
| HISTORICAL PLAY | "CONTENT DATA 4" | 12:33:42 – 14:34:10 |
| ... | ... | ... |

INFORMATION DISTRIBUTION DEVICE, INFORMATION RECEPTION DEVICE, SYSTEM, PROGRAM, AND METHOD

CROSS-REFERENCE TO RELATED PATENT APPLICATIONS

This application is a divisional of U.S. patent application Ser. No. 14/110,732, filed Oct. 9, 2013, which is a National Stage Entry of International Application No. PCT/JP2012/058030, filed Mar. 21, 2012, which claims priority from Japanese Patent Application No. 2011-087492, filed Apr. 11, 2011. The entire contents of the above-referenced applications are expressly incorporated herein by reference.

TECHNICAL FIELD

The invention relates to an information distribution device, an information reception device, a system, a program, and a method.

BACKGROUND ART

An advertisement is one of important ways for well informing clients of commodities and services, and it is preferable to distribute a highly-effective advertisement.

For example, Patent document 1 describes one example of an image display system that changes advertisement displays depending on client features.

RELATED ART DOCUMENT

Patent Document

[Patent document 1] Japanese Patent Application Laid-Open No. 2004-157498

SUMMARY OF THE INVENTION

Problem to be Solved by the Invention

The system distributes an advertisement to people in front of an image display device in a public space. The system occasionally distributes the advertisement to a person who has no interest in content distributed from the image display device (e.g. a person who passes fast). Therefore, advertising effect cannot be fully increased.

A TV commercial is well-known as an advertisement which impresses a large indefinite number of clients on commodities. An advertisement corresponding to clients' tastes cannot be distributed using only such push advertisement. The push advertisement does not passively generate full advertising effect.

In order to solve the above problem, an object of the invention is to provide an information distribution device, a system, a program, and a method which can increase advertising effect by distributing an advertisement which matches a person who is expected to be affected by appeal effect.

Means to Solve the Problem

In order to achieve the object, one aspect of the present invention includes an information distribution device that obtains content from content storage means, transmits the content to a terminal device having display means for displaying an image of the content, receives a personal attribute from attribute collection means, included in each of the k (where k is a natural number which is two or more) terminal devices, the attribute collection means for collecting the personal attribute on a person in a viewable region for the image, selects advertisement data from an advertisement storage unit based on a result of statistical processing on the personal attribute collected while transmitting the content, and transmits the selected advertisement data to the n (where n is a natural number greater than k) terminal devices.

The present invention provides an information distribution program, causing a computer to execute a step of obtaining content from content storage means, a step of transmitting the content to a terminal device having display means for displaying an image of the content, a step of receiving a personal attribute from attribute collection means, included in each of the k (where k is a natural number which is two or more) terminal devices, for collecting the personal attribute on a person in a viewable region for the image, a step of selecting advertisement data in an advertisement storage unit based on a result of statistical processing on the personal attribute collected while transmitting the content, and a step of transmitting the selected advertisement data to the n (where n is a natural number greater than k) terminal devices.

The present invention provides an information distribution method, comprising: obtaining content from content storage means; transmitting the content to a terminal device having display means for displaying an image of the content; receiving a personal attribute from attribute collection means, included in each of the k (where k is a natural number which is two or more) terminal devices, for collecting the personal attribute on a person in a viewable region for the image; selecting advertisement data from an advertisement storage unit based on a result of statistical processing on the personal attribute collected while transmitting the content; and transmitting the selected advertisement data to the n (where n is a natural number greater than k) terminal devices.

The present invention provides an information distribution device, comprising: advertisement storage means for storing advertisement data and an advertisement attribute associated with each other; conversion-information storage means for storing a first conversion rule from a personal attribute to the advertisement attribute; and information distribution means for obtaining content from content storage means, transmitting the content to display means for displaying an image of the content, receiving, from attribute collection means for collecting a personal attribute on a person in a viewable region for the image, the personal attribute, determining the advertisement attribute based on the personal attribute, collected while transmitting the content, and the first conversion rule, selecting the advertisement data related to the determined advertisement attribute from the advertisement storage means; and transmitting the selected advertisement data to the display means.

The present invention provides an information distribution program, causing a computer to execute, a step of obtaining content from content storage means, and an information distribution step of transmitting the content to display means for displaying an image of the content, receiving a personal attribute from attribute collection means for collecting the personal attribute on a person in a viewable region for the image, receiving the personal attribute collected while transmitting the content, determining an advertisement attribute based on a first conversion rule, being stored in conversion-information storage means, from the personal attribute to the advertisement attribute, and transmitting the selected advertisement data to the display means.

The present invention provides an information distribution method, comprising: obtaining content from content storage means; transmitting the content to display means for displaying an image of the content; receiving a personal attribute from attribute collection means for collecting the personal attribute on a person in a viewable region for the image; receiving the personal attribute collected while transmitting the content, and determining the advertisement attribute based on a first conversion rule, being stored in conversion-information storage means, from the personal attribute to the advertisement attribute; selecting advertisement data associated with the determined advertisement attribute from the advertisement storage means for storing the advertisement data and the advertisement attribute associated with each other; and transmitting the selected advertisement data to the display means.

The present invention provides an information reception device, comprising: attribute collection means for collecting a personal attribute on a person in a region where an image of content displayed on a display for displaying the content and advertisement data is viewable, where the content and the advertisement data is received from an information distribution device including advertisement storage means for storing the advertisement data and an advertisement attribute associated with each other, conversion-information storage means for storing a conversion rule to convert the personal attribute to the advertisement attribute, and information distribution means for selecting, from the advertisement storage means, the advertisement data associated with the advertisement attribute determined based on the personal attribute, collected while transmitting the content, and the conversion rule, and transmitting the selected advertisement data, and for transmitting the personal attribute to the information distribution device.

The present invention provides an information reception program, causing a computer to execute a display step of receiving and displaying content and advertisement data from an information distribution device including advertisement storage means for storing the advertisement data and an advertisement attribute associated with each other, conversion-information storage means for storing a conversion rule to convert a personal attribute to the advertisement attribute, and information distribution means for selecting, from the advertisement storage means, the advertisement data associated with the advertisement attribute determined based on the personal attribute, collected while transmitting the content, and the conversion rule, and transmitting the selected advertisement data, and an attribute collection step of collecting the personal attribute on a person in a region where an image of the displayed content is viewable and transmitting the personal attribute to the information distribution device.

The present invention provides an information reception method, comprising: receiving and displaying content and advertisement data from an information distribution device including advertisement storage means for storing the advertisement data and an advertisement attribute associated with each other, conversion-information storage means for storing a conversion rule to convert a personal attribute to the advertisement attribute, and information distribution means for selecting, from the advertisement storage means, the advertisement data associated with the advertisement attribute determined based on the personal attribute, collected while transmitting the content, and the conversion rule, and transmitting the selected advertisement data; collecting the personal attribute on a person in a region where an image of the displayed content is viewable; and transmitting to the information distribution device.

Effect of the Invention

The present invention provides an information distribution device, a system, a program, and a method which enables to increase advertising effect by distributing an advertisement which matches a person who is expected to be affected by an appeal effect.

BRIEF EXPLANATION ON DRAWINGS

Figure 11:
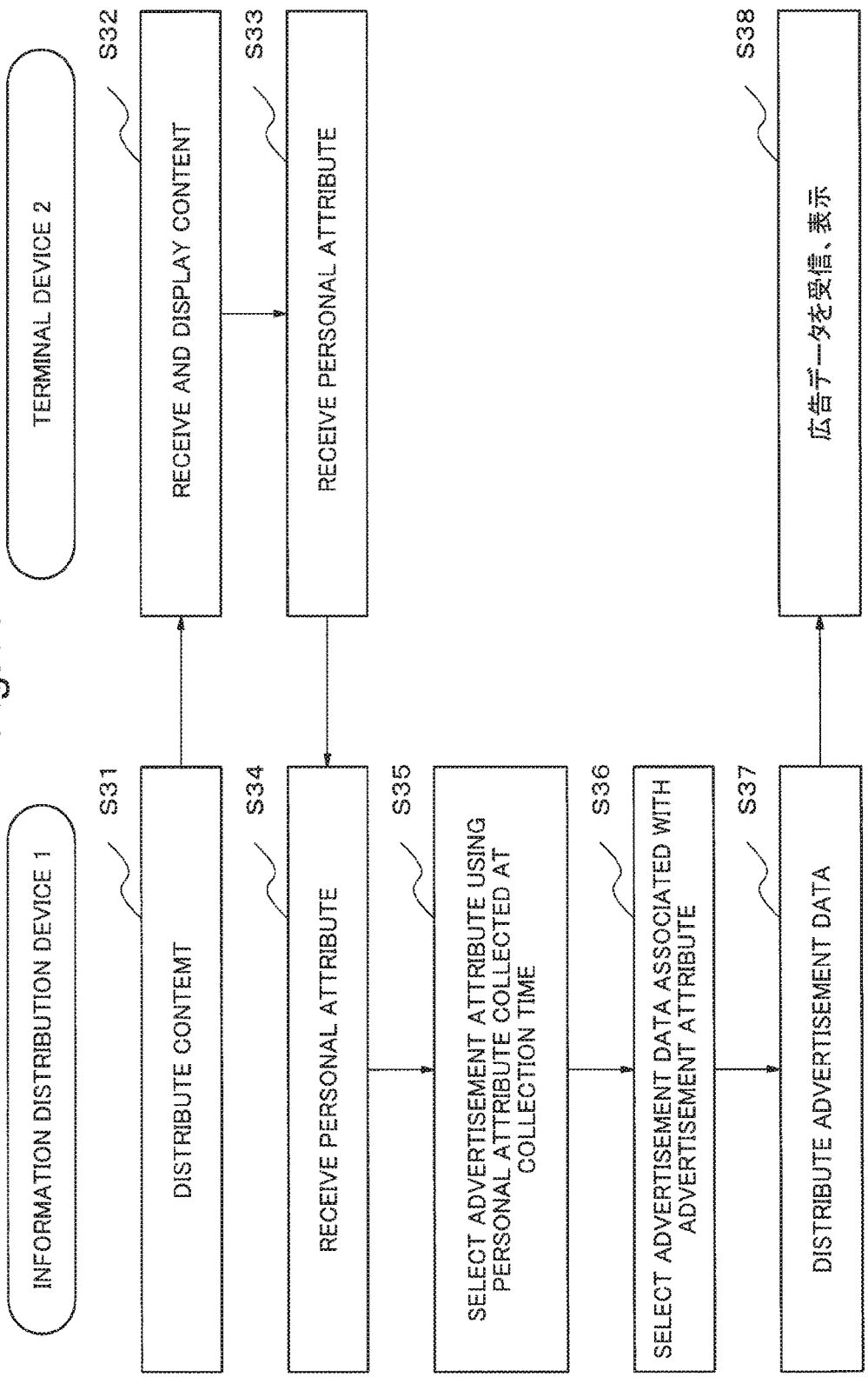
Figure 12:
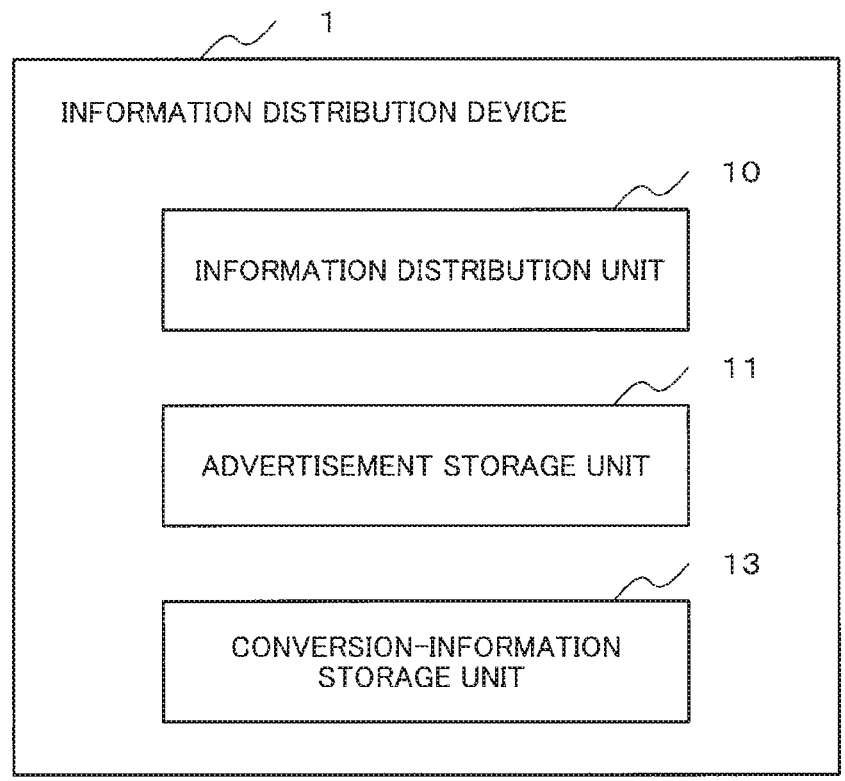
Figure 13:
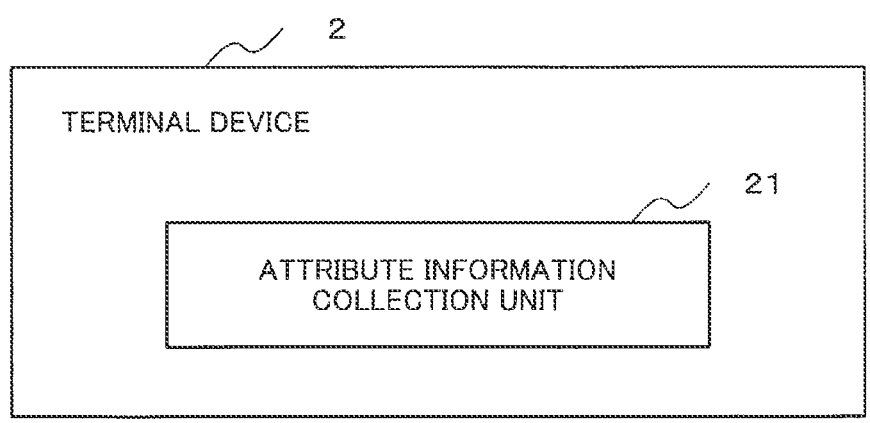
Figure 14:
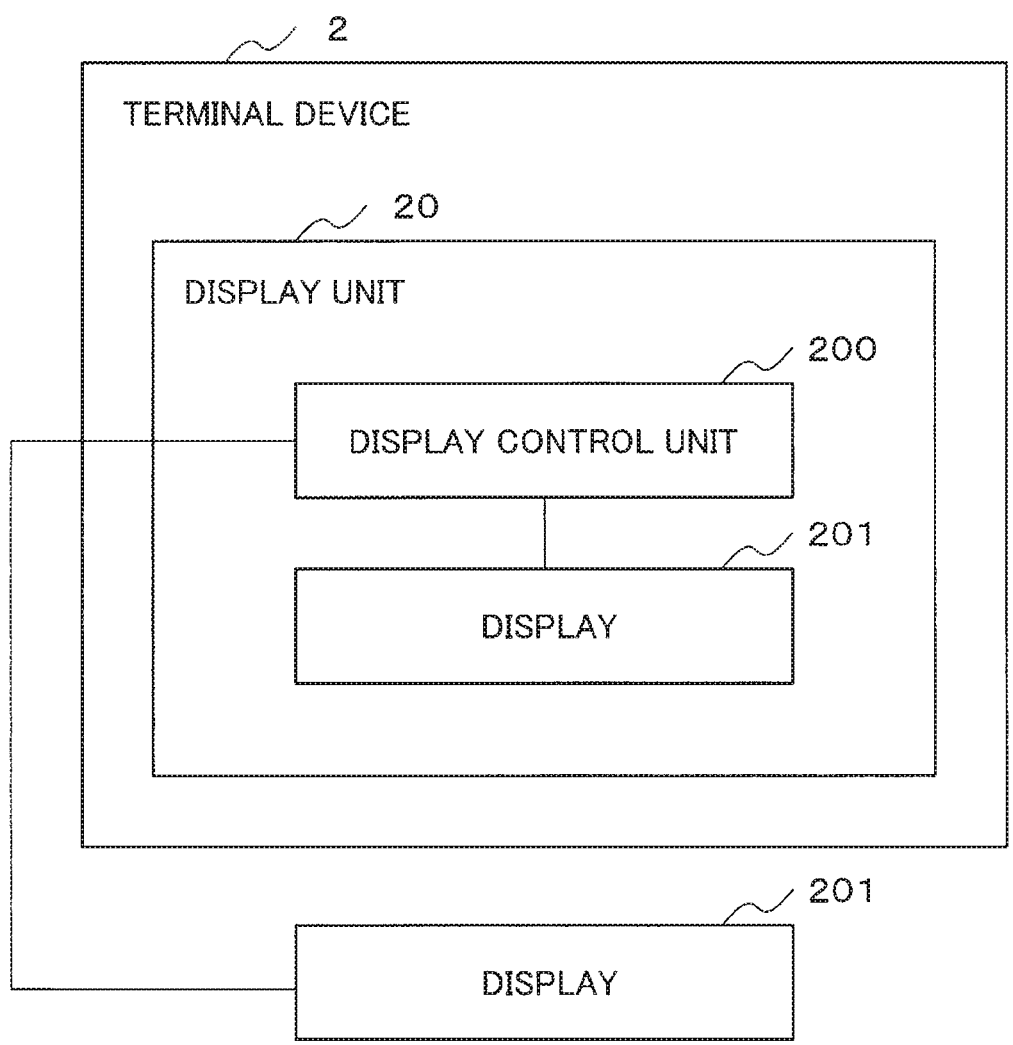

FIG. 1 is a block diagram illustrating an example of a configuration of the first exemplary embodiment, FIG. 2 is a diagram illustrating an example of an advertisement storage unit 11 of the first exemplary embodiment, FIG. 3 is a diagram illustrating an example of a content storage unit 12 of the first exemplary embodiment, FIG. 4 is a flow diagram illustrating an example of an operation of the first exemplary embodiment, FIG. 5 is a diagram illustrating an example of a conversion-information storage unit 13 of the first exemplary embodiment, FIG. 6 is a diagram illustrating an example of a schedule table of the first exemplary embodiment, FIG. 7 is a diagram illustrating an example of a coefficient table of the first exemplary embodiment, FIG. 8 is a diagram illustrating an example of a conversion-information storage unit 13 of the second exemplary embodiment, FIG. 9 is a flow diagram illustrating an example of an operation of the second exemplary embodiment, FIG. 10 is a diagram illustrating an example of a content storage unit 12 of the third exemplary embodiment, FIG. 11 is a flow diagram illustrating an example of an operation of the third exemplary embodiment, FIG. 12 is a block diagram illustrating an example of an information distribution device 1 of the fourth exemplary embodiment, FIG. 13 is a block diagram illustrating an example of a configuration of a terminal device 2 of the fifth exemplary embodiment, FIG. 14 is an explanatory diagram of an example of a display unit 20.

EXEMPLARY EMBODIMENTS TO CARRY OUT THE INVENTION

Exemplary embodiments to carry out the invention are explained below with drawings. In all the drawings, the same elements have the same reference numerals and explanations thereabout are optionally omitted.

Each unit which configures a device of each exemplary embodiment is configured by hardware, e.g. a logic circuit. Each unit may include a control unit, memory, a program which is loaded on the memory, a storage unit, like a hard disk storing the program, and an interface to connect a network. Each unit may be a combination of hardware and software. Unless otherwise noted, an achieving method and a device thereof are not limited.

The control unit includes a CPU (Central Processing Unit), or the like. The control unit operates an operating system and controls all of the devices, reads programs and data from a recording medium placed in a drive device to the memory, and executes various processes according thereto.

The recording medium may be an optical disc, a flexible disc, magneto-optical disc, an external hard disk, a semiconductor memory, or the like. The recording medium records a computer program in a computer-readable manner. The computer program may be downloaded from an external computer (not shown) connected to a communication network.

The communication network may be Internet, LAN (Local Area

Network), a wireless communication network, or a network configured by a combination thereof.

First Exemplary Embodiment

Next, the first exemplary embodiment of the invention is explained with reference to drawings.

FIG. 1 illustrates an information distribution system A according to the first exemplary embodiment. The information distribution system A includes an information distribution device 1 and a terminal device 2. In the information distribution system A, the information distribution device 1 transmits various types of information to the terminal device 2 using a wireless or a wired communication. Information transmission from the information distribution device 1 to the terminal device 2 is carried out by broad casting. The information may be distributed through an Internet lines, e.g. an Internet TV (television). The number of the terminal devices 2 may be more than one, or preferably more than 500 or more than 1000.

The information distribution device 1 includes an information distribution unit 10, an advertisement storage unit 11, a content storage unit 12, and a conversion-information storage unit 13.

The information distribution unit 10 is broadcasting devices placed in a broadcast station. The information distribution unit 10 has a capability of distributing information, like voices, images, to the terminal devices 2 using electric signals. The information distribution unit 10 may distribute the information through the Internet lines, like the Internet TV. Various methods for distributing information are well known, the method is not limited to specific ones.

The information distribution unit 10 includes a function of referring to a conversion rule described below and determining an advertisement attribute associated with a personal attribute. The information distribution unit 10 obtains advertisement data associated with the determined advertisement attribute from the advertisement storage unit 11, and distributes the obtained advertisement data to the terminal devices 2.

The advertisement storage unit 11 may be managed by the broadcast station, for example. The advertisement storage unit 11 stores the advertisement data obtained from an advertiser, an advertising agency, or the like. As shown in FIG. 2, the advertisement storage unit 11 stores the advertisement data (that is advertisement) and the advertisement attribute associated with each other. The advertisement data is, for instance, a still picture or a motion picture including images and voices. The advertisement data is stored in the advertisement storage unit 11 in a predetermined form. The advertisement attribute is information indicating types of the advertisement data. For example, if content of the advertisement is associated with golf commodities, the advertisement attribute of "sports" is given to the advertisement.

The advertisement attribute is given by the advertiser, the advertising agency, or the like. The advertisement attribute of the advertisement associated with the golf commodities is not limited to "sports". The advertiser, the advertising agency, or the like can give the advertisement attribute with an appropriate granularity in order to make the advertisement easy to manage. For example, if the golf commodities which are intended to advertise relate to golf clubs, the advertising agency may give the advertisement attribute of "golf club" instead of that of "sports". If the advertising golf commodities relate to golf clothing, the advertising agency may give the advertisement attribute of "golf clothing". If the advertising golf commodities relate to toy golf clubs for kids, the advertising agency may give the advertisement attribute of "toy of golf goods". Giving such advertisement attributes, the advertising agency can give the advertisement attributes with fine granularity compared with totally giving the advertisement attribute of "sports". The advertisement attributes may be a name of talent or commodities appearing in the advertisements.

The advertisement may be an advertisement for CM (Commercial Message) broadcasting which is broadcasted between TV programs. In this case, each advertisement is broadcasted at a time of a predetermined advertising spot, as shown in a TV program schedule table in FIG. 6. Broadcasting time for content and advertisements are described in the TV program schedule table in FIG. 6. The TV program schedule table may be preliminarily stored in a storage unit (not shown) in the information distribution device 1.

The content storage unit 12 is managed by the broadcasting station, and stores content data (that is content). The content is a still picture or a motion picture including images and voices, and is stored in the content storage unit 12 in a predetermined form. The broadcasting station may obtain the content from a content production company or a TV program production company, and store it in the content storage unit 12.

The content may be content for broadcasting of TV programs. In this case, as shown in FIG. 6, for example, content may be broadcasted in accordance with the predetermined TV program schedule. The content may be broadcasting programs which are received by a TV receiver from TV broadcasting waves distributed by the broadcasting station.

The content storage unit 12 may store the content data and a content attribute associated with each other as shown in FIG. 3. The content attribute is information indicating a type of content and is given to the content by a content production company, a broadcasting station, an advertiser, as advertisement agency, or the like. For example, if the content relates to a golf program, the content includes the content attribute of "sports program". The content attribute given to the golf program is not limited to "sports program". If the content relates to a golf program, the given attribute may be "golf program". The content production company may give the content attribute with an appropriate granularity so as to make the content easy to manage. The content attribute may be a name of a talent or commodities appearing in the content.

The conversion-information storage unit 13 stores a rule of conversion from a personal attribute to an advertisement attribute (that is a first conversion rule). The conversion-information storage unit 13 may store the table which associates time information, the personal attribute, and the advertisement attribute with one another for each channel, as shown in FIG. 5. The channel is identification information identifying a frequency band at the time of content distribution. The time information is the information indicating the time when the content is distributed from the information distribution device 1 to the terminal device 2.

The personal attribute is a feature value representing person characteristics. In FIG. 5, sex and an age of a person is used as the personal attribute. The personal attribute may be an amount of a hair and a hair color of a person, a hair style, the presence or absence of a hat, the presence or absence of a mask, the presence or absence of glasses, lightness of clothing, a logo indicating brands of bags or accessories which a person wears, or other information. The personal attribute may be a viewer's response to content (e.g. laughing, crying, or being surprised). Conversion from a personal attribute to an advertisement attribute is described by using an example of FIG. 5. FIG. 5 shows that if the personal attribute obtained by an attribute-information collection unit 21, which will be described below, between 12:00:00 and 12:15:30, on Dec. 10, 2010 is "sex: male, age: 12 or less", the personal attribute is converted to "advertisement attribute: toy". Similarly, if the personal attribute obtained by the attribute-information collection unit 21 between 12:16:00 and 12:30:30 on the same day is "sex: female, age: 20's to 30's", the personal attribute is converted to the advertisement attribute "cloth". The conversion-information storage unit 13 stores the conversion rule to convert a personal attribute to an advertisement attribute. The table of FIG. 5 is described as an example of the conversion rule. If the conversion rule is a mapping in which a personal attribute is inputted and an advertisement attribute is outputted, the conversion rule is not particularly limited. The conversion-information storage unit 13 may store the table associating the personal attribute with the advertisement attribute without distinguishing the channels. The conversion-information storage unit 13 may store the conversion rule which does not depend on the channel or the time information.

The terminal device 2 includes a display unit 20 and the attribute-information collection unit 21.

The display unit 20 includes a display, e.g. a plasma display panel, a liquid crystal display panel, a CRT (Cathode Ray Tube). The display unit 20 includes a display control function of outputting images and voices of the content and the advertisement. The display unit 20 specifically includes a display control unit 200 and a display 201 as shown in FIG. 14. The display control unit 200 displays received content and an advertisement on the display. As shown in FIG. 14, the display 201 may be placed outside the terminal device 2. The terminal device 2 having the display unit 20 may be a TV receiver which is placed in a home and receives TV broadcasting waves. The information distribution device 1 may broadcast TV programs and CM advertisements to the TV receivers placed in homes.

The attribute-information collection unit 21 has a function of collecting the above personal attribute. The attribute-information collection unit 21 has a function of collecting the personal attributes of e.g. sex and an age of a person, based on an image of the person imaged by an imaging device, e.g. a CCD (Charge Coupled Device) camera, CMOS (Complementary Metal Oxide Semiconductor) camera, placed near the display device 20. It is possible to collect a feature value such as sex or an age of a person from an image of the person based on various well-known methods. The method is not particularly limited to specific one.

The imaging device is placed for example near the display device 20. The imaging device images a region where the display unit 20 can be viewed (that is a viewable region). The imaging device may be mounted on the terminal device 2 or placed on a wall or a ceiling near the terminal device 2. The viewable region is a region where images or voices outputted from the display unit 20 can be viewed or received. The region may be a region arranged by an administrator in advance.

The attribute-information collection unit 21 may collect information on a person from a hand-held terminal, a smart card, or the like which is held by the person located in the viewable region of the display unit 20. If the hand-held-terminal includes the personal attribute, like a sex, an age, or taste information, of the person, the attribute-information collection unit 21 may collect the personal attribute from the hand-held terminal based on a RFID (Radio Frequency IDentification) function in the hand-held terminal, through a RFID reader placed near the display unit 20, or the like. A method to collect the personal attribute is not particularly limited to specific one.

When two persons or more are located in the viewable region, the attribute-information collection unit 21 may select one person using the way described below and obtain the personal attribute of the person.

For example, the terminal device 2 stores a coefficient table shown in FIG. 7 in a storage unit (not shown). A first coefficient table includes a direction of a face of a person located in the viewable region with respect to the display 201, and a coefficient 1 related thereto. The attribute-information collection unit 21 may compare a preset front view template image of a face with a viewer's face, and determine the direction of the viewer's face. A second coefficient table includes a person's pupil size and a coefficient 2 related thereto. The pupil size is set by an administrator in advance, so that the average value of people's pupil size is used as a standard, and the size of the average value is medium, the size larger than the average value by a given value is large, and the size smaller than the average value by a given value is small. The attribute-information collection unit 21 calculates a value of a given value× coefficient 1×coefficient 2, as a score representing a degree of interest, for each person located in the viewable region. For example, suppose that there are a viewer A (male, 10's), a viewer B (female, 40's), a viewer C (male, 40's) in the viewable region, the viewer A faces the front, and the pupil size of the viewer A is large. In this case, if the given value is 10, the degree of interest of the viewer A is 10×1×1=10. If the viewer B faces rearward, the degree of interest is zero. If the viewer C faces the right side and the size of the pupil of the viewer C is large, the degree of interest is 10×0.5× 1=5. In this case, the attribute-information collection unit 21 obtains the personal attribute of the viewer A whose degree of interest is the highest, i.e. "age: 10's, sex: male", and does not collect the personal attributes of the other two persons. As described above, when two persons or more are located in the viewable region, the attribute-information collection unit 21 may select one person therein and collect the attribute thereof. Calculation of the degree of interest may be performed based on the distance between a viewer and the display 201, viewing time of the display 201, or the like, instead of the direction of the face and the size of the pupil, and is not limited to a specific one. In the above descriptions, selection of the person is performed using the degree of interest. However, the attribute-information collection unit 21 may collect the degree of interest itself. The degree of interest may be used as marketing information.

The attribute-information collection unit 21 periodically obtains the personal attribute, and successively transmits the obtained personal attribute to an information distribution device 1, each time obtaining the personal attribute. When the information distribution device 1 receives the personal attribute, an information distribution unit 10 specifies the personal attribute having the highest frequency in the personal attributes collected while distributing content, in the received personal attributes. The information distribution unit 10 selects the advertisement attribute above described based on the specified personal attribute. The information distribution unit 10 may refer to content distribution time indicated in the TV program schedule table of FIG. 6, and specify the personal attribute having the highest frequency within the time. The information distribution unit 10 may select the advertisement attribute above described based on the specified personal attribute.

The attribute-information collection unit 21 may receive the TV program schedule table of FIG. 6 from the information distribution unit 10. After the terminal device 2 receives content, the attribute-information collection unit 21 may periodically collect the personal attribute until a predetermined time comes. The attribute-information collection unit 21 may specify the personal attribute having the highest frequency in the collected personal attributes and transmit the personal attribute to the information distribution device 1 at a predetermined time. The predetermined time is the time earlier, by a predetermined period of time, than the time the information distribution unit 10 distributes the advertisement data. For example, according to the TV program schedule table of FIG. 6 received by the attribute-information collection unit 21, an advertising spot is set between 12:15:30 and 12:16:00, after the distribution time of content data 1 for a golf program which is set between 12:00:00 and 12:15:30. In this case, the attribute-information collection unit 21 continues to periodically collect the personal attribute from the distribution time for the content data 1 of 12:00:00 until the time which is the predetermined time earlier than the advertisement distribution time of 12:15:30 (e.g. until 12:14:00, if the predetermined time is 1 minute, 30 seconds). Regarding the collected personal attributes, if "sex: male, age: 23" is collected 3 times, "sex: female, age: 42" is collected 5 times, and "sex: male, age: 50" is collected 7 times, the attribute-information collection unit 21 transmits "sex: male, age: 50" which is the personal attribute having the highest frequency to the information distribution device 1 at the predetermined time of 12:14:00.

Operations of an information distribution system A in the exemplary embodiment is explained with FIG. 4.

The information distribution unit 10 obtains content to be distributed at the time from the content storage unit 12, for example, by referring to the TV program schedule table in FIG. 6, and distributes to the terminal device 2 (step S11).

When the terminal device 2 receives the content, the display unit 20 displays the content (step S12). The attribute-information collection unit 21 obtains the personal attribute on the person located in the viewable region using the method above described (step S13).

The attribute-information collection unit 21 periodically obtains the personal attribute, and successively transmits the obtained personal attribute and information of the time when the personal attribute is obtained to the information distribution device 1 each time the personal attribute is obtained. The attribute-information collection unit 21 may obtain the time from a clock installed in the terminal device 2, an external radio clock, or the like. The attribute-information collection unit 21 obtains channel information on the content displayed on the display unit 20 from the display unit 20. The attribute-information collection unit 21 associates the channel information, the time information, and the obtained personal attribute with one another and transmits them to the information distribution device 1.

When the information distribution device 1 receives the information (step S14), the information distribution unit 10 refers to the first conversion rule shown in FIG. 5, refers to the right record of the channel information and the time information, and selects the advertisement attribute related to the obtained personal attribute (step S15). For instance, if the channel information is a channel 1, and the received time information indicates the time between 12:00:00 and 12:15:30, the information distribution unit 10 refers to the top row record in FIG. 5. If the obtained personal attribute is for example "sex: male, age 23", the personal attribute corresponds to "sex: male, age: other". In this case, the information distribution unit 10 selects the advertisement attribute of "clock" which is the associated advertisement attribute next.

Next, the information distribution unit 10 selects the advertisement data associated with the selected advertisement attribute from the advertisement storage unit 11 (step S16). For example, if the information distribution unit 10 obtains the advertisement attribute of "clock", the information distribution unit 10 obtains the associated "advertisement data 4" from the advertisement storage unit 11 in FIG. 2.

If the first conversion rule does not depend on the channel or the time information, the attribute-information collection unit 21 may transmits only the personal attribute to the information distribution unit 1. In this case, the information distribution unit 10 selects the advertisement attribute associated with the personal attribute which is received while the information distribution unit 10 distributes content, among the personal attributes received by the information distribution unit 1, by referring to the first conversion rule.

The information distribution unit 10 distributes the obtained advertisement data to the terminal device 2 (step S17). As shown in the TV program schedule table of FIG. 6, since the advertising spot is determined in advance for each channel, the information distribution unit 10 distributes the advertisement data at while the period of time of the advertising spot of the TV program schedule table.

It is preferable that the advertisement data determined based on the collected personal attribute is distributed in the advertising spot just after the content distribution, at the time of which the person with the collected personal attribute is more likely to stay in the region. Therefore, according to the schedule of the channel 1 in FIG. 6, it is preferable that the information distribution unit 10 determines the advertisement to be distributed between 12:15:30 and 12:16:00, based on the personal attribute collected by the attribute-information collection unit 21 between 12:00:00 and 12:15:30. In this case, the predetermined time above described is preferably set in consideration of the period of time while the personal attribute is converted to the advertisement attribute and the period of time while the information distribution unit 10 selects the advertisement data.

In step S14 to step S16, when the information distribution device 1 fails to receive the personal attribute or when the advertisement attribute related to the personal attribute is not found, the information distribution unit 10 may obtain a given default advertisement from a storage unit of the advertisement storage unit 11, or the like, and distribute to the terminal device 2.

Next, the terminal device 2 receives the advertisement data transmitted from the information distribution unit 10. Then, the display unit 20 displays the advertisement (step S18).

According to the exemplary embodiment, the information distribution device 1 determines the advertisement to be distributed based on the personal attribute collected while content is distributed. That is, according to the exemplary embodiment, after distribution of the content, it is possible to select and distribute the advertisement which matches a viewer who gets an interest in content and stays in the viewable region while the content is distributed.

Therefore, according to the exemplary embodiment, since not only the advertisement is distributed unilaterally, but the advertisement which matches the viewer who gets an interest in the content is distributed after the content is distributed, the advertising effect can be increased.

And, as described in the document of the background art, when the advertisement to be distributed is determined by extracting a personal attribute of a client who passes in front of an image display device in a public space, a full advertising effect is not necessarily produced because the client has possibly passed in front of the image display device when the advertisement is distributed. On the other hand, according to the exemplary embodiment, since the content is distributed first, and then the advertisement is distributed to the viewer who gets an interest therein, the advertisement which matches the person who is likely to be in the place can be distributed. Therefore, the advertising effect can be increased.

The information distribution device 1 may include a conversion rule which associates the personal attribute with the advertisement data, and directly select the advertisement data to be distributed from the received personal attribute without the advertisement attribute. The information distribution device 1 may transmit the advertisement not after the content distribution, but in parallel with the content distribution.

In the above descriptions, the example is explained, in which the advertisement to be distributed to the terminal device 2 is determined based on the personal attribute of the person located in front of one terminal device 2. The exemplary embodiment is not limited thereto.

For instance, the information distribution device 1 may carry out statistical processing on viewers' personal attributes collected from a large number (that is, k (which is roughly 100, for example)) of the terminal devices 2 which are separately placed, select the advertisement based on the result, and distribute the advertisement to the plurality of the terminal devices 2. The information distribution device 1 may determine one personal attribute based on the mode, the average, the median, or the like of the personal attributes obtained from the terminal devices 2, and select and distribute the advertisement attribute associated with the personal attribute. The information distribution device 1 may select the sex which is major among sexes (male, female) obtained from the terminal devices 2. And, the information distribution device 1 may calculate the average value of ages obtained from the terminal devices 2. And, the information distribution device 1 may refer to the conversion rule above described using the sex and the age, and determine the advertisement to be distributed. In this way, the information distribution device 1 may determine the advertisement to be distributed to a plurality of terminal devices based on the personal attributes obtained from the plurality of terminal devices.

The information distribution device 1 may distribute content to the plurality of terminal devices 2, and receive the personal attributes from the attribute-information collection units 21 which k of the terminal devices 2 include. The information distribution device 1 may select the advertisement from the advertisement storage unit 11 based on the result of the statistical processing on the personal attributes collected while transmitting the content, and transmit the selected advertisement to n terminal devices (where n is a natural number greater than k). The information distribution device 1 does not collect the personal attribute from all the n terminal devices 2, but may collect the personal attributes from the k terminal devices and determine the advertisement to be distributed to the n terminal devices based on the collected personal attributes. The k terminal devices 2 are preferably the terminal devices which are selected from the n terminal devices 2 by an appropriate sampling. And, it is preferable that the information distribution device 1 is able to estimate a tendency or a trend of viewers of the n terminal devices by using the k terminal devices. And, it is preferable that k is great enough to estimate a tendency of a population in order to limit a sampling error in a given range. The number of samples with respect to a population required to limit a sampling error to a given range can be calculated using a well-known method. For instance, the number of samples may be a range of 39 to 390 (×ten times) units per one million units. The value is based on the following estimation. That is, assuming that the number of the TV receivers in Japan is 48 million, the ratio of the number of viewers in the Kanto area is 0.38 hundred million/1.18 hundred million=32%, the number of viewing rate monitoring households=600, and each TV receiver includes one attribute-information collection unit 21, the number of the attribute-information collection units 21 per one million TV receivers is 39 (=600÷(48×0.32)). Needless to say, the number and the estimation method are nothing but one of examples.

Each of the viewable regions of the plurality of terminal devices 2 may not be overlapped and be exclusive region. The personal attribute collected by one attribute-information collection unit 21 may be a personal attribute of a person located near the one terminal device 2. In order to achieve the above situation, each of the plurality of terminal devices 2 may be placed at each household, and may be separately placed.

A destination of the attribute-information collected by the attribute-information collection unit 21 and a place where the statistical processing is performed are not necessarily the information distribution device 1. For instance the statistical processing may be performed in a different device, and the result of the statistical processing may be transmitted to a broadcasting station or an advertisement agency. The statistical processing may be performed on a cloud computing system.

The collected attribute-information may be analyzed by the information distribution device 1 or other devices, and be used as marketing information.

And, the information distribution device 1 may transmit information on the selected one advertisement to a server of the advertisement agency (not shown). The advertisement agency may charge the advertiser based on the information.

Second Exemplary Embodiment

Next, the second exemplary embodiment is explained with reference to drawings. In the exemplary embodiment, the content storage unit 12 stores the content data and the content attribute associated with each other.

The conversion-information storage unit 13 stores a conversion rule (that is, a second conversion rule) from the content attribute and the personal attribute to the advertisement attribute. The information distribution unit 10 determines the advertisement attribute based on the collected personal attribute, the content attribute associated with the transmitted content, and the second conversion rule, and selects the advertisement data associated with the determined advertisement attribute. These differences are mainly described below.

The content storage unit 12 stores the content data and the content attribute associated with each other. The content attribute has been described in the first exemplary embodiment, therefore the descriptions thereof is omitted.

The conversion-information storage unit 13 stores the conversion rule (which is the second conversion rule) from the content attribute and the personal attribute to the advertisement attribute. The conversion-information storage unit 13 may store a table in which the personal attribute is associated with the advertisement attribute for each content attribute as shown in FIG. 8. In this case, for example, the top row record of FIG. 8 represents that when the content attribute is "content attribute: golf program" and the personal attribute obtained by the attribute-information collection unit 21 is "sex: male, age: 12 or less", the content attribute and the personal attribute are converted to "advertisement attribute: golf toy". The table is exemplified here, however the form of the conversion rule is not limited to a specific one, if it is a mapping in which the content attribute and the personal attribute are inputted, and the advertisement attribute is outputted. In FIG. 8, the conversion-information storage unit 13 includes the table which differs from one channel to another. However, the conversion-information storage unit 13 may store the table in which the personal attribute is associated with the advertisement attribute for each content attribute without being distinguished by the channel.

The information distribution unit 10, unlike the operation described in the first exemplary embodiment, determines the advertisement based on the content attribute associated with the content transmitted to the terminal device 2, the personal attribute collected by the attribute-information collection unit 21, and the second conversion rule stored in the conversion-information storage unit 13. The information distribution unit 10 selects the advertisement data associated with the determined advertisement attribute from the advertisement storage unit 11, and distributes the advertisement data to the terminal device 2 after content distribution. Detailed operations are described below.

Operations of an information distribution system A in the exemplary embodiment are explained with FIG. 9. Initially the information distribution unit 10 obtains content to be distributed at the time in accordance with the TV program schedule table in FIG. 6, and distributes the content to the terminal device 2 (step S21).

When the terminal device 2 receives the content, the display unit 20 displays the content (step S22). Then, the attribute-information collection unit 21 obtains personal attributes of a person located in the viewable region (step S23). Here, the attribute-information collection unit 21 periodically obtains the personal attribute, and successively transmits the obtained personal attribute and information on the time when the personal attribute is obtained to the information distribution device 1 each time the personal attribute is obtained. On this occasion, the attribute-information collection unit 21 may obtain the time from e.g. a built-in clock of the terminal device 2, an external radio clock, or the like. The attribute-information collection unit 21 obtains channel information of the content displayed in the display unit 20 from the control unit, associates the channel information, the time information, and the obtained personal attribute with one another, and transmits the channel information, the time information, and the obtained personal attribute to the information distribution device 1.

When the information distribution device 1 receives the above information (step S24), the information distribution unit 10 obtains the content attribute of the content currently transmitted from the content storage unit 12. The information distribution unit 10 may specify the content attribute based on the channel information obtained by referring to the TV program schedule table in FIG. 6 and the time information. For instance, if the channel is the channel 1, and the time indicated by the time information is the time between 12:00:00 and 12:15:30, the content attribute is "golf program" as shown in FIG. 6.

Next, the information distribution unit 10 selects the associated advertisement attribute based on the content attribute and the obtained personal attribute by referring to the conversion rule indicated in FIG. 8 based on the channel information (step S25). For instance, if the channel information is the channel 1 and the content attribute is "golf program", the information distribution unit 10 refers to the top row record of FIG. 8. If the obtained personal attribute is e.g. "sex: male, age: 23", the personal attribute corresponds to "sex: male, age: other" in the conversion rule of FIG. 8. The information distribution unit 10 therefore selects the advertisement attribute of "golf club" which is the associated advertisement attribute.

Next, the information distribution unit 10 selects the advertisement data associated with the selected advertisement attribute from the advertisement storage unit 11 (step S 26). If the advertisement attribute obtained by the information distribution unit 10 is a golf club, the information distribution unit 10 obtains associated "advertisement data 1" from the advertisement storage unit 11 of FIG. 2.

Next, the information distribution unit 10 distributes the obtained advertisement data to the terminal device 2 (step S27). The terminal device 2 receives the advertisement data. Next the display unit 20 displays the advertisement (step S28).

The information distribution device 1 of the exemplary embodiment determines the advertisement to be distributed based on the personal attribute of a viewer during content distribution and contents of the content. The information distribution device 1 therefore can distribute not only the personal attribute but the advertisement related to the contents of the content. The information distribution device 1 can distribute the golf-related advertisement to a viewer who is watching a golf program, and further can change the golf-related advertisement to be distributed into an advertisement of golf clothing, an advertisement of a golf club, or an advertisement of a golf toy, depending on the personal attribute of the viewer. According to such configuration, the advertiser and the advertisement agency can preliminarily determine the advertisement attribute which is intended to advertise, regarding the content attribute and the personal attribute. Therefore, a targeting advertisement can be carried out using not only the personal attribute but the contents of the content.

Therefore, according to the exemplary embodiment, since the advertisement is unilaterally distributed and the advertisement which matches the viewer can be distributed to the viewer who gets an interest in the content, the advertising effect is increased.

Third Exemplary Embodiment

Next a third exemplary embodiment is explained with reference to drawings.

The exemplary embodiment differs from the first exemplary embodiment in that the content storage unit 12 stores the content and the collection time for the personal attribute associated with each other. And the exemplary embodiment differs from the first exemplary embodiment in that the information distribution unit 10 selects the advertisement data based on the personal attribute collected at the collection time. The differences are described below.

The content storage unit 12, as shown in FIG. 10, stores the collection time for the personal attribute of the attribute information collection unit 21 and the content associated with one another. The collection time is given by a collection time provider, e.g. a content production company, a broadcasting company, an advertiser, an advertisement agency, or the like. The collection time provider sets the time when a highlight scene in the content, or a part of content including a specific commodity, facilities like a golf course, a hotel, a travel scene, or the like, are played back in the terminal device 2, as the collection time. The collection time provider may set the time when a part of content in which a voice level is a predetermined level or more, or a part of content in which brightness is a predetermined brightness or more, are played back, as the collection time. The time may be a relative time starting at a program starting time.

The information distribution device 1 may detect the part of content in which a voice level is a predetermined level or more, or the part of content in which brightness is a predetermined brightness or more, by analyzing the content data. The information distribution device 1 may store the time when the parts is played back, as the collection time, in the content storage unit 12.

Two or more collection times are possible, and the collection time may be a period of time. For instance, in the example shown in FIG. 10, the collection time of the personal attribute related to the content attribute: "content data 2" of travel program is the time slot from 12:33:22 to 12:34:50. The collection times of the personal attribute related to the content attribute: "content data 3" of drama are 13:30:12 and 13:35:11.

The information distribution unit 10 refers to the collection time stored in the content storage unit 12. The information distribution unit 10 refers to the conversion-information storage unit 13 of the first exemplary embodiment or the second exemplary embodiment based on the personal attribute collected by the attribute-information collection unit 21 at the collection time or the time near the collection time (that is, the time within a predetermined time from the collection time). The information distribution unit 10 selects a related advertisement attribute. The information distribution unit 10 selects the advertisement data associated with the selected advertisement attribute from the advertisement storage unit 11, and transmits the advertisement data to the terminal device 2.

Next, operations of an information distribution system A in the exemplary embodiment are explained with FIG. 11. Initially the information distribution unit 10 obtains content to be distributed at the time in accordance with the TV program schedule table in FIG. 6, and distributes the content to the terminal device 2 (step S31). At this time, the information distribution unit 10 may distribute information on the collection time stored in the content storage unit 12 to the terminal device 2 together with the content.

When the terminal device 2 receives the content, the display unit 20 displays the content (step S32). The attribute-information collection unit 21 obtains a personal attribute of a person located in the viewable region (step S33).

The attribute-information collection unit 21 transmits the obtained personal attribute to the information distribution device 1. The attribute-information collection unit 21 periodically obtains the personal attribute, and successively transmits the obtained personal attribute and information on the time when the personal attribute is obtained to the information distribution device 1 each time the personal attribute is obtained. When receiving information on the collection time from the information distribution unit 10 in step S32, the attribute-information collection unit 21 may obtain the time from a built-in clock of the terminal device 2, an external radio clock, or the like. Only when the current time coincides with the collection time, the attribute-information collection unit 21 may obtain the personal attribute and transmit the personal attribute to the information distribution device 1. In this way, an amount of data can be reduced rather than successively transmitting the personal attribute from the terminal device 2 to the information distribution device 1. The attribute-information collection unit 21 associates the channel information, the time information obtained from the inside or the outside of the terminal device, and the obtained personal attribute with one another, and transmits the channel information, the time information obtained from the inside or the outside of the terminal device, and the obtained personal attribute to the information distribution device 1.

When the information distribution device 1 receives the above-described information (step S34), the information distribution unit 10 specifies the distributing content. The information distribution unit 10 may specify the content based on the channel information obtained by referring to the TV program schedule table in FIG. 6 and the time information. Next, the information distribution unit 10 refers to the content storage unit 12 and obtains the collection time associated with the specified content.

Next, the information distribution unit 10 extracts, from the obtained personal attributes, the personal attribute collected by the attribute-information collection unit 21 at the collection time or the time near the collection time (that is, the time within a predetermined time from the collection time). Next, the information distribution unit 10 selects the advertisement attribute using the personal attribute (step S35). That is, the information distribution unit 10 refers to the conversion rule shown in FIG. 5 or FIG. 8. The information distribution unit 10 selects the related advertisement attribute based on the personal attribute or based on the personal attribute and the content attribute.

The information distribution unit 10 selects advertisement data related to the selected advertisement attribute from the advertisement storage unit 11 (step S36). For instance, if the advertisement attribute obtained by the information distribution unit 10 is "golf club", the information distribution unit 10 obtains associated "advertisement data 1" from the advertisement storage unit 11 of FIG. 2.

Next, the information distribution unit 10 distributes the obtained advertisement data to the terminal device 2 (step S37). The terminal device 2 receives the advertisement data. The display unit 20 displays the advertisement (step S38).

Since the information distribution device 1 of the exemplary embodiment determines the advertisement to be distributed next, based on the personal attribute collected in the specific part in content, an advertiser can distribute the advertisement which matches viewers viewing the specific part in the content, in addition to the effects of the first exemplary embodiment and the second exemplary embodiment. Therefore, according to the exemplary embodiment, since it is possible not only to unilaterally distribute an advertisement but also to distribute, to the viewer getting an interest in the content, the advertisement which matches the viewer, the effect of the advertisement is increased.

Fourth Exemplary Embodiment

Next a fourth exemplary embodiment is explained with reference to drawings.

As shown in FIG. 12, an information distribution device 1 of the exemplary embodiment includes the information distribution unit 10, the advertisement storage unit 11, and the conversion-information storage unit 13.

The advertisement storage unit 11 stores the advertisement data and the advertisement attribute associated with each other. The conversion-information storage unit 13 stores the first conversion rule from a personal attribute to an advertisement attribute. The information distribution unit 10 obtains content from the content storage unit 12 outside or inside the information distribution device 1, and transmits the content to the terminal device 2 displaying the content. The information distribution unit 10 receives the personal attribute from the attribute-information collection unit 21 collecting the personal attribute of a person located in a viewable region of the content. The information distribution unit 10 specifies the personal attribute collected while transmitting the content. Next, the information distribution unit 10 determines the advertisement attribute based on the first conversion rule stored in the conversion-information storage unit 13. Next, the information distribution unit 10 selects advertisement data associated with the determined advertisement attribute from the advertisement storage unit 11, and transmits the selected advertisement data to the terminal device 2.

According to the information distribution device 1 of the exemplary embodiment, since it is possible not only to unilaterally distribute an advertisement but also to distribute, to a viewer getting an interest in the content, the advertisement which matches the viewer, the effect of the advertisement is increased.

Fifth Exemplary Embodiment

Next a fifth exemplary embodiment is explained with reference to drawings.

As shown in FIG. 13, a terminal device 2 of the exemplary embodiment includes the attribute-information collection unit 21.

The terminal device 2 receives content from the information distribution device 1, and the display unit 20 displays it. The attribute-information collection unit 21 collects the personal attributes of one person or more in the region where an image of the content displayed on the display device 20 can be viewed, and transmits them to the information distribution device 1. And, the terminal device 2 receives, from the information distribution device 1, the advertisement data associated with the advertisement attribute, which is determined by the information distribution device 1 based on the personal attribute collected while receiving the content and the first conversion rule, or based on the personal attribute, the content attribute, and the second conversion rule. The display unit 20 displays the advertisement data.

According to the terminal device 2 of the exemplary embodiment, since it is possible not only to unilaterally distribute an advertisement but also to distribute, to a viewer getting an interest in the content, the advertisement which matches the viewer, the effect of the advertisement is increased.

Though being explained based on the above exemplary embodiment, the inventions are not limited to the above descriptions. It is to be understood that to the configurations and details of the invention of the present application, various changes can be made within the scope of the invention of the present application by those skilled in the art.

This application claims priority from Japanese Patent Application No. 2011-087492 filed on Apr. 11, 2011, the contents of which are incorporation herein by reference in their entirety.

EXPLANATION ON REFERENCE NUMERALS 1 information distribution device
10 information distribution unit
11 advertisement storage unit
12 content storage unit
13 conversion-information storage unit
2 terminal device
20 display unit
21 attribute-information collection unit

The invention claimed is:

1. An information distribution device, comprising:
an advertisement memory storing advertisement data and advertisement attributes associated therewith;
a conversion-information memory storing a first conversion rule for converting a personal characteristic attribute to an advertisement attribute, wherein the personal characteristic attribute is obtained through visual observation; and
a processor configured to implement an information distribution unit to:
    obtain a content for display,
    transmit the content to an information reception device including a display for displaying an image of the content,
    receive a first personal characteristic attribute collected from a person in a viewable region for the image, wherein the person is determined among a plurality of persons in the viewable region based on a score of each of the plurality of persons that represents a degree of interest, and the score is calculated based on measured information on each of the plurality of persons,
    determine a first advertisement attribute based on the first personal characteristic attribute and the first conversion rule,
    select a first piece of the advertisement data associated with the first advertisement attribute from the advertisement memory, and
    transmit the first piece of the advertisement data to the display.

2. The information distribution device of claim 1, further comprising:
a content memory storing contents and content attributes associated therewith, wherein:
the conversion-information memory stores a second conversion rule converting a content attribute and a personal characteristic attribute to an advertisement attribute, and
the information distribution unit
    determines the first advertisement attribute by determining a second advertisement attribute based on the first personal characteristic attribute, a first content attribute associated with the transmitted content, and the second conversion rule, and
    selects the first piece of the advertisement data by selecting a second piece of the advertisement data associated with the second advertisement attribute.

3. The information distribution device of claim 1, further comprising:
a content memory storing contents and collection times at which personal characteristic attributes are collected,
wherein the information distribution unit selects the first piece of the advertisement data based on the first personal characteristic attribute collected at a first collection time.

4. The information distribution device of claim 1, wherein:
the information distribution unit transmits the content by transmitting the content to a plurality of terminal devices, each terminal device including an attribute collection unit,
the information distribution unit receives the first personal characteristic attribute by:
receiving a plurality of personal characteristic attributes from the plurality of terminal devices, and
determining one of the plurality of personal characteristic attributes to be the first personal characteristic attribute based on a statistical value of the plurality of personal characteristic attributes.

5. An information reception device, comprising:
a processor configured to implement an attribute collection unit to:
calculate a score representing a degree of interest for each of a plurality of persons in the viewable region based on measured information on each of the plurality of persons,
determine, based on the score, a person whose personal characteristic attribute is collected,
collect the personal characteristic attribute on the person in a region where an image displayed on a display is viewable, wherein the display is for displaying contents and advertisement data, and the personal characteristic attribute is obtained through visual observation received from an information distribution device, and
transmit the personal characteristic attribute to the information distribution device.

6. The information reception device according to claim 5, wherein the measured information is at least one of biological information or a posture of the person.

7. The information reception device according to claim 5, wherein the processor is further configured to implement an attribute collection unit to:
calculate the score based on at least one of a direction of a face, a pupil size, a direction to a display, and time of viewing a display.

8. The information reception device according to claim 5, wherein the processor is further configured to implement an attribute collection unit to:
calculate the score based on at least two of a direction of a face, a pupil size, a direction to a display, and time of viewing a display.

9. An information distribution system, comprising:
an information distribution device, including:
an advertisement memory storing advertisement data and advertisement attributes associated therewith;
a conversion-information memory storing a first conversion rule for converting a personal characteristic attribute to an advertisement attribute, wherein the personal characteristic attribute is obtained through visual observation; and
a first processor configured to implement an information distribution unit to:
obtain a content for display,
transmit the content to an information reception device including a display for displaying an image of the content,
receive a first personal characteristic attribute collected from a person in a viewable region for the image, wherein the person is determined among a plurality of persons in the viewable region based on a score of each of the plurality of persons that represents a degree of interest, and the score is calculated based on measured information on each of the plurality of persons,
determine a first advertisement attribute based on the first personal characteristic attribute and the first conversion rule,
select a first piece of the advertisement data associated with the first advertisement attribute from the advertisement memory, and
transmit the first piece of the advertisement data to the display; and
the information reception device, including:
the display for displaying an image; and
a second processor configured to implement an attribute collection unit to:
calculate a score representing a degree of interest for each of the plurality of persons in the viewable region based on measured information on each of the plurality of persons,
determine, based on the score, the person whose personal characteristic attribute is collected,
collect the first personal characteristic attribute on the person in the region where an image displayed on a display is viewable, wherein the display is for displaying contents and advertisement data received from the information distribution device, and
transmit the first personal characteristic attribute to the information distribution device.

10. A non-transitory tangible computer-readable medium storing an information distribution program that, when executed by a computer, causes the computer to perform a method, the method comprising:
obtaining a content for display;
transmitting the content to a display for displaying an image of the content,
receiving a first personal characteristic attribute collected from a person in a viewable region for the image, wherein the person is determined among a plurality of persons in the viewable region based on a score of each of the plurality of persons that represents a degree of interest, and the score is calculated based on measured information on each of the plurality of persons,
determining a first advertisement attribute based on the first personal characteristic attribute and a first conversion rule for converting a personal characteristic attribute to an advertisement attribute, wherein the personal characteristic attribute is obtained through visual observation,
selecting a first piece of advertisement data associated with the first advertisement attribute, and
transmitting the first piece of the advertisement data to the display.

11. The non-transitory tangible computer-readable medium of claim 10, wherein:
determining the first advertisement attribute includes determining a second advertisement attribute based on the first personal characteristic attribute, a first content attribute associated with the transmitted content, and a second conversion rule, the second conversion rule being for converting a content attribute and a personal characteristic attribute to an advertisement attribute, and selecting the first piece of the advertisement data includes selecting a second piece of the advertisement data associated with the second advertisement attribute.

12. The non-transitory tangible computer-readable medium of claim 10,
wherein selecting the first piece of the advertisement data includes selecting the first piece of the advertisement data based on the first personal characteristic attribute collected at a first collection time.

13. The non-transitory tangible computer-readable medium of claim 10, wherein:
transmitting the content includes transmitting the content to a plurality of terminal devices, each terminal device including an attribute collection unit, and
receiving the first personal characteristic attribute includes:
receiving a plurality of personal characteristic attributes from the plurality of terminal devices, and
determining one of the plurality of personal characteristic attributes to be the first personal characteristic attribute based on a statistical value of the plurality of personal characteristic attributes.

14. A non-transitory tangible computer-readable medium storing an information reception program that, when executed by a computer, causes the computer to perform a method, the method comprising:
receiving and displaying a content and advertisement data from an information distribution device,
calculating a score representing a degree of interest for each of a plurality of persons in the viewable region based on measured information on each of the plurality of persons,
determining, based on the score, a person whose personal characteristic attribute is collected, collecting the personal characteristic attribute on the person in a region where an image of the displayed content is viewable, wherein the personal characteristic attribute is obtained through visual observation, and
transmitting the personal characteristic attribute to the information distribution device.

15. An information distribution method, comprising:
obtaining a content for display;
transmitting the content to a display for displaying an image of the content;
receiving a first personal characteristic attribute collected from a person in a viewable region for the image, wherein the person is determined among a plurality of persons in the viewable region based on a score of each of the plurality of persons that represents a degree of interest, and the score is calculated based on measured information on each of the plurality of persons;
determining a first advertisement attribute based on the first personal characteristic attribute and a first conversion rule for converting a personal characteristic attribute to an advertisement attribute, wherein the personal characteristic attribute is obtained through visual observation;
selecting a first piece of advertisement data associated with the first advertisement attribute; and
transmitting the first piece of advertisement data to the display.

16. The information distribution method of claim 15, wherein:
determining the first advertisement attribute includes determining a second advertisement attribute based on the first personal characteristic attribute, a first content attribute associated with the transmitted content, and a second conversion rule, the second conversion rule being for converting a content attribute and a personal characteristic attribute to an advertisement attribute; and
selecting the first piece of the advertisement data includes selecting a second piece of the advertisement data associated with the second advertisement attribute.

17. The information distribution method of claim 15,
wherein selecting the first piece of the advertisement data includes selecting the first piece of the advertisement data based on the first personal characteristic attribute collected at a first collection time.

18. The information distribution method of claim 15, wherein:
transmitting the content includes transmitting the content to a plurality of terminal devices, each terminal device including an attribute collection unit; and
receiving the first personal characteristic attribute includes:
receiving a plurality of personal characteristic attributes from the plurality of terminal devices; and
determining one of the plurality of personal characteristic attributes to be the first personal characteristic attribute based on a statistical value of the plurality of personal characteristic attributes.

19. An information reception method, comprising:
receiving and displaying a content and advertisement data from an information distribution device;
calculating a score representing a degree of interest for each of a plurality of persons in the viewable region based on measured information on each of the plurality of persons;
determining, based on the score, a person whose personal characteristic attribute is collected;
collecting the personal characteristic attribute on the person in a region where an image of the displayed content is viewable, wherein the personal characteristic attribute is obtained through visual observation; and
transmitting the personal characteristic attribute to the information distribution device.

20. An information distribution apparatus, comprising:
a memory storing instructions; and
a processor configured to execute the instructions to:
obtain a content for display;
transmit the content to a display for displaying an image of the content,
receive a first personal characteristic attribute collected from a person in a viewable region for the image, wherein the person is determined among a plurality of persons in the viewable region based on a score of each of the plurality of persons that represents a degree of interest, and the score is calculated based on measured information on each of the plurality of persons,
determine a first advertisement attribute based on the first personal characteristic attribute and a first conversion rule for converting a personal characteristic attribute to an advertisement attribute, wherein the personal characteristic attribute is obtained through visual observation,
select a first piece of advertisement data associated with the first advertisement attribute, and
transmit the first piece of the advertisement data to the display.

21. An information reception apparatus, comprising:
a memory storing instructions;
a processor configured to execute the instructions to:
receive and display a content and advertisement data from an information distribution device, calculate a score representing a degree of interest for each of a plurality of persons in the viewable region based on measured information on each of the plurality of persons, determine, based on the score, a person whose personal characteristic attribute is collected, collect the personal characteristic attribute on the person in a region where an image of the displayed content is viewable, wherein the personal characteristic attribute is obtained through visual observation, and transmit the personal characteristic attribute to the information distribution device.

* * * * *